United States Patent [19]

Berenson

[11] 4,281,237
[45] Jul. 28, 1981

[54] SAFETY CIRCUIT FOR ELECTRIC BEDCOVER

[75] Inventor: Allen V. Berenson, Chicago, Ill.

[73] Assignee: Sunbeam Corporation, Chicago, Ill.

[21] Appl. No.: 17,509

[22] Filed: Mar. 5, 1979

[51] Int. Cl.³ .......................... H05B 1/02; H02H 1/02
[52] U.S. Cl. .................................. 219/511; 219/212; 219/508
[58] Field of Search .............. 219/212, 490, 505, 494, 219/504, 501, 483, 508; 337/415

[56] References Cited

U.S. PATENT DOCUMENTS

| 774,623 | 11/1904 | Wales | 219/212 |
|---|---|---|---|
| 2,565,478 | 8/1951 | Crowley | 219/212 |
| 3,408,469 | 10/1968 | Mills | 219/212 X |
| 3,493,727 | 2/1970 | Hosokawa et al. | 219/505 |
| 3,628,093 | 12/1971 | Crowley | 219/212 |
| 3,708,649 | 1/1973 | Crowley et al. | 219/212 |
| 3,803,385 | 4/1974 | Sandorf | 219/483 |
| 3,814,899 | 6/1974 | Gordon, Jr. et al. | 219/212 |

FOREIGN PATENT DOCUMENTS 559495  2/1975  Switzerland ........................ 219/212

Primary Examiner—Gene Z. Rubinson
Assistant Examiner—M. Paschall
Attorney, Agent, or Firm—George R. Clark; Neil M. Rose; Allen J. Hoover

[57] ABSTRACT

In an electric bedcover of a type wherein a safety thermostat having a bimetallic element is adapted to deenergize a heater when the bimetallic element is heated sufficiently, as when an overheated condition occurs, an elongated flexible sensor of a type comprising a pair of conductors spaced from each other by a layer of material having a negative temperature coefficient of resistance is adapted to influence the bimetallic element through a resistor, which is mounted for heat dissipation to the bimetallic element, and a first circuit branch comprising the resistor, the conductors, and the layer between the conductors, in series with each other, is connected so as to maintain the conductors at different potentials when the heater operates, and so as to conduct sufficient current to cause the resistor to conduct sufficient heat to cause the bimetallic element to open the contacts when some part of the layer between the conductors is heated so as to act as an electrical conductor having a low impedance rather than as an electrical insulator having a high impedance. Both such circuit branches are confined by a network of serpentine passages within a fabric shell of the electric blanket.

3 Claims, 5 Drawing Figures

FIG. 3
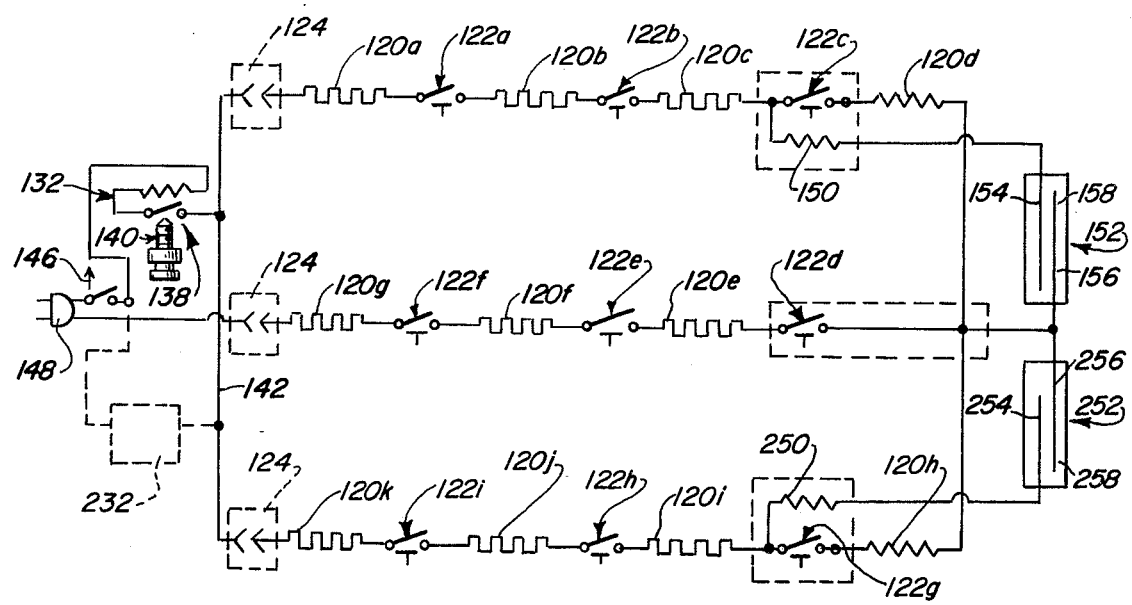
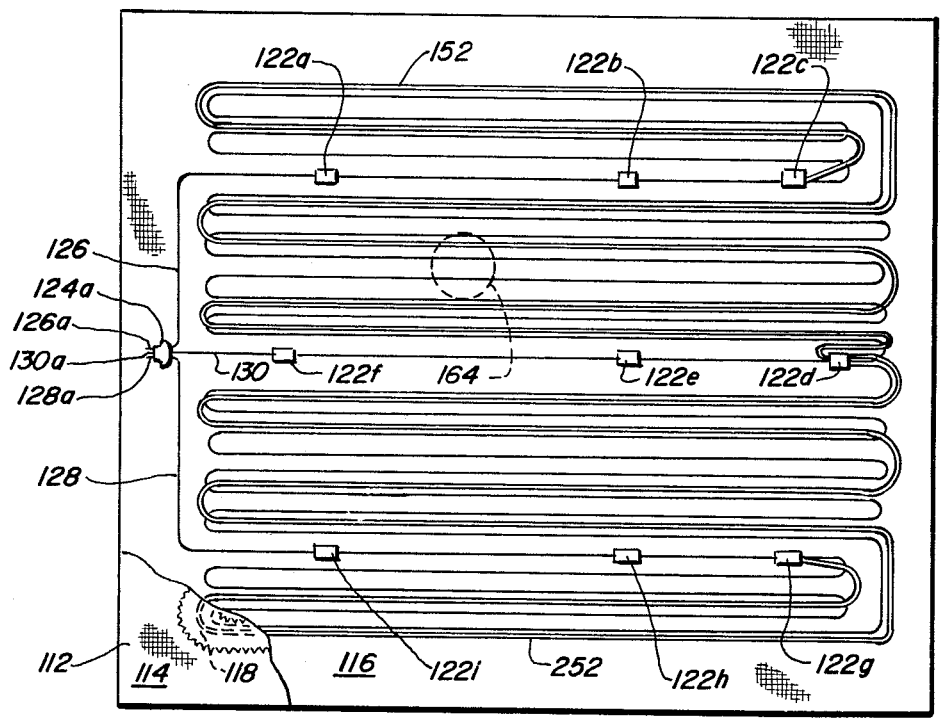
FIG. 4

SAFETY CIRCUIT FOR ELECTRIC BEDCOVER

CROSS-REFERENCE TO RELATED APPLICATIONS

Cross-reference is made to an application of Richard H. Williams for Safety Circuit for Electric Bedcover, as filed simultaneously herewith, and as assigned commonly herewith.

BACKGROUND OF THE INVENTION

1. Field of the Invention

This invention relates generally to temperature-responsive protective circuits for electric bedcovers. It relates particularly to an electric bedcover of a type wherein a safety thermostat having a bimetallic element is adapted to deenergize a heater when the bimetallic element is heated sufficiently, as when an overheated condition obtains.

Adequate protective circuits are necessary in an electric bedcover so as to prevent an overheated condition from starting a fire in flammable bedclothes, scorching a fabric portion of the electric bedcover, or injuring a person who may be either asleep or bedridden. An overheated condition may be caused by covering a substantial area of the electric bedcover as by a conventional blanket, by tucking more than unheated marginal portions of the electric bedcover under a mattress, by rumpling a substantial area of the electric bedcover, and otherwise.

2. Description of the Prior Art

It is conventional for an electric bedcover to have a fabric shell, which has two or more plies and a network of serpentine passages within the plies, and an elongated flexible heater, which is deployed through the network of serpentine passages, as exemplified by U.S. Pat. No. 2,203,918 to I. O. Moberg. It also is conventional for a thermostatic device, which is known in its conventional form as an ambient-responsive control, to be used for adjustable control of an on-off cycle of the heater as a function of ambient temperature.

Early electric bedcovers having such ambient-responsive controls are disclosed in U.S. Pat. No. 2,195,958 to W. K. Kearsley and U.S. Pat. No. 2,344,820 to W. K. Kearsley. As disclosed in U.S. Pat. No. 3,708,649 to G. C. Crowley et al., it is common to provide such a bedcover also with an array of safety thermostats which are connected in series between series segments of the heater, and which are located at strategic places within the plies of the fabric shell, and it is known to integrate an ambient-responsive control with the fabric shell.

It is known from U.S. Pat. No. 2,565,478 to G. C. Crowley, U.S. Pat. No. 2,581,212 to D. C. Spooner et al., and U.S. Pat. No. 2,846,560 to Jacoby et al., to employ an elongated flexible component which is deployed as a cable through the network of serpentine passages of the fabric shell of an electric bedcover, which comprises a pair of elongated flexible electrical conductors spaced from each other by a layer of material having a negative temperature coefficient of resistance, and in which one of the conductors constitutes the heater and the other conductor constitutes a carrier for a signal indicative of an overheated condition. An overheated condition causing some part of the layer between the conductors to become a conductor rather than an insulator causes closed contacts of an electromagnetic relay to open so as to deenergize the heater.

It is known from U.S. Pat. No. 2,846,559 to J. Rosenberg, U.S. Pat. No. 3,114,820 to R. G. Holmes, and U.S. Pat. No. 3,222,497 to W. H. Gordon, Jr., to employ an elongated flexible component which acts as a sensor but not as a heater, which is deployed as a cable alongside a separate heater through the network of serpentine passages of the fabric shell of an electric bedcover, and which also comprises a pair of elongated flexible electrical conductors spaced from each other by a layer of material having a negative temperature coefficient of resistance. Each conductor forms a part of a circuit energizing a relay, whose contacts must be closed for the heater to be energized, whereby an overheated condition causing some part of the layer between the conductors to become a conductor rather than an insulator opens the contacts. Cf. U.S. Pat. No. 4,034,185 to G. C. Crowley.

It is known from U.S. Pat. No. 3,418,454 to W. D. Ryckman, Jr., to employ an elongated flexible component which also acts as a sensor but not as a heater, which also is deployed as a cable alongside a separate heater through the network of serpentine passages of the fabric shell of an electric bedcover having an ambient-responsive control as mentioned above, and which also comprises a pair of elongated flexible conductors spaced from each other by a layer of negative temperature coefficient of resistance. Each conductor forms a part of a circuit energizing resistive heaters associated with respective ones of a pair of bimetallic arms of another thermostatic device.

The pair of bimetallic arms of such thermostatic device carry respective contacts, through which the heater is energized, and which are closed when sufficient heat is supplied to each arm by the heater associated with such arm. An overheated condition causing the layer between the conductors of the sensor to become a conductor rather than an insulator divides a current, so as to cause less heat to be supplied by the heater associated with one arm, whereupon such arm tends to open the contacts.

In each circuit wherein an element comprising a pair of conductors separated by a layer of material having a negative temperature coefficient of resistance acts as a sensor but not as a heater as mentioned above, the conductors are intended to carry current during normal operation of the electric blanket. The conductors and associated components of the circuits comprising the conductors have inherent resistance and thus contribute to overall power dissipation of the electric bedcover during its normal operation.

U.S. Pat. No. 2,782,290 to P. E. Lannan et al. discloses, for an electric bedcover, several protective circuits employing an elongated flexible sensor, which comprises a pair of conductors separated by a layer of material having a negative temperature coefficient of rectification. Other protective devices for such electric bedcovers are disclosed in U.S. Pat. No. 3,628,093 to G. C. Crowley, U.S. Pat. No. Re. 28,656 (originally U.S. Pat. No. 3,673,381) to G. C. Crowley et al. and U.S. Pat. No. 3,683,151, No. 3,588,466, and No. 3,588,447, to E. R. Mills et al.

It is known from British Patent Specification No. 1,372,627 to Dimplex Limited, to employ, in an electrical room-heating appliance, a thermistor, by which is understood a compact, rigid, semiconductive component to be mounted on a bracket, but which has a negative temperature coefficient of resistance, in circuits controlling current through a resistor, which is mounted for heat dissipation influencing a thermostatic control for a main heater of the appliance. Similar circuits are understood to have been used in hair dryers.

The application of Richard H. Williams discloses, in an electric blanket having a fabric shell and an ambient-responsive control as mentioned above, a different arrangement wherein an elongated flexible sensor which comprises a pair of conductors spaced from each other by a layer of material having a negative temperature coefficient of resistance, is adapted to influence a bimetallic element of a thermostatic device through a resistor, which is mounted for heat dissipation to the bimetallic element. The sensor and the resistor are connected so as to conduct little current, and thus so as to dissipate little power, except when the layer between the conductor acts as a conductor rather than as an insulator.

In the aforesaid arrangement of said application, the thermostatic device is the ambient-responsive control, to which the resistor is added, and which thus is located outside the fabric shell. As another external lead is required to connect the resistor to the sensor, conventional connectors cannot be used to connect the ambient-responsive control and the circuits confined by the fabric shell.

The aforesaid arrangement of said application may be used advantageously either independently or to supplement conventional safety thermostats. However, if an attempt were made either deliberately or accidentally to power the heater of the electric blanket directly from line voltage, the protective circuit disclosed in said application could be ineffective.

A need remains for a protective circuit which also may be used either independently or to supplement conventional safety thermostats, but which may be confined by the network of serpentine passages within the fabric shell, which does not require any additional leads, which permits standard connectors to be used to connect an ambient-responsive control to the circuits confined by the fabric shell, and which would be effective if the heater of the electric blanket were to be powered directly from line voltage.

SUMMARY OF THE INVENTION

Accordingly, this invention provides an improvement in an electric bedcover of a type comprising a fabric shell, which has a network of serpentine passages within its plies, an elongated heater, which is deployed through at least some of the passages, and a safety thermostat, which is located within the network of serpentine passages, which comprises a bimetallic element and electrical contacts arranged to be opened and closed by the bimetallic element, and which is operative to disconnect at least part of the heater from the source of electrical power at the contacts when the bimetallic element is heated sufficiently and to reconnect the same part of the heater to the source of electrical power when the bimetallic device is cooled sufficiently.

By the improvement of this invention, an elongated flexible sensor, of a type which is used in known electric bedcovers of other types that do not rely on such safety thermostats, and which comprises a pair of elongated flexible electrical conductors spaced from each other by an elongated flexible layer of material having a negative temperature coefficient of resistance, is deployed through at least some of the passages, a resistor is mounted for heat dissipation from the resistor to the bimetallic element of the safety thermostat, and a first circuit branch comprising the resistor, the conductors, and the layer between the conductors, in series with each other, is connected so as to maintain the conductors at relatively different electrical potentials at least when the heater operates.

Advantageously, the first circuit branch may be connected in parallel with a second circuit branch comprising at least part of the heater. Alternatively, it may be connected so as to be independent of any ambient-responsive control or other external control means.

Accordingly, the first circuit branch conducts little current except when some part of the layer between the conductors is heated so as to act as an electrical conductor having a low impedance rather than as an electrical insulator having a high impedance, as in an overheated condition of at least part of the electric bedcover, whereas the first circuit branch conducts sufficient current to cause the resistor to dissipate sufficient heat to cause the bimetallic element to open the contacts of the safety thermostat when some part of the layer between the conductors thus acts as a conductor.

Significantly, a protective circuit according to this invention may be connected so as to be contained entirely within the fabric shell of an electric blanket, whereupon no additional leads are required, and a standard connector may be used to connect any suitable control, which may be an ambient-responsive control having a bimetallic armature, a solid-state control, a variable-resistance control, or any other suitable control. If no control is used, or if a control is used but is bypassed or fails so as to power the electric blanket directly from line voltage, the protective circuit according to this invention remains effective.

A protective circuit according to this invention may be used either independently or to supplement conventional safety thermostats, whereupon the safety thermostat used in the protective circuit according to this invention is a selected one of plural safety thermostats connected in series respectively between series segments of the heater. Such other thermostats may be conventional.

A protective circuit according to this invention may be provided for each of parallel branches of the heater, as in an electric bedcover for a double bed, whereupon a branch of the sensor cooperates in like manner with each branch of the heater. One branch of the heater may operate while other branches of the heater may be disconnected, by such protective circuits provided for such branches, as when an overheated condition obtains in some parts of the electric bedcover but not in all parts.

BRIEF DESCRIPTION OF THE DRAWINGS

FIG. 3 is a schematic diagram of another embodiment of this invention having particular utility in an electric bedcover for a double bed.

FIG. 4 is a positional layout of a heater having two parallel branches and a common return, a sensor having two parallel branches, and a fabric shell, for the embodiment of FIG. 3.

DETAILED DESCRIPTION OF PREFERRED EMBODIMENTS

Figure 1:
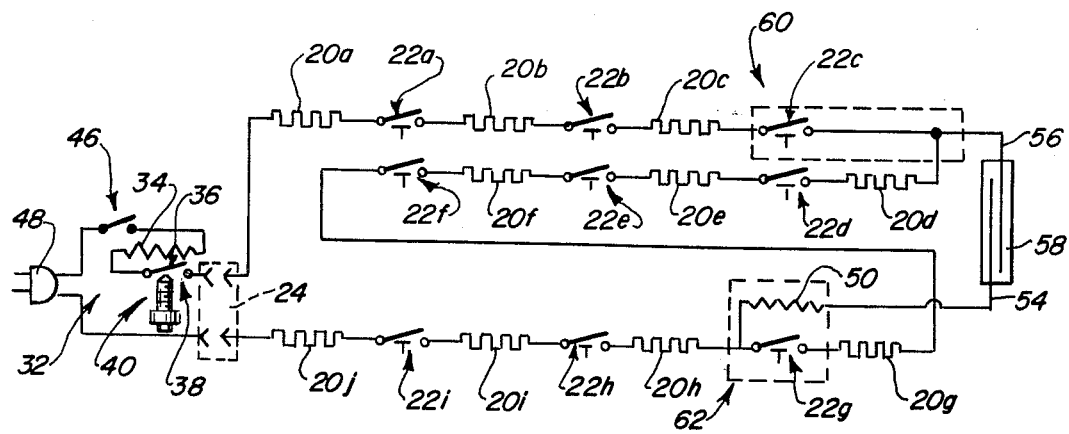
FIG. 1 is a schematic diagram of a preferred embodiment of this invention having particular utility in an electric bedcover for a standard bed.
Figure 2:
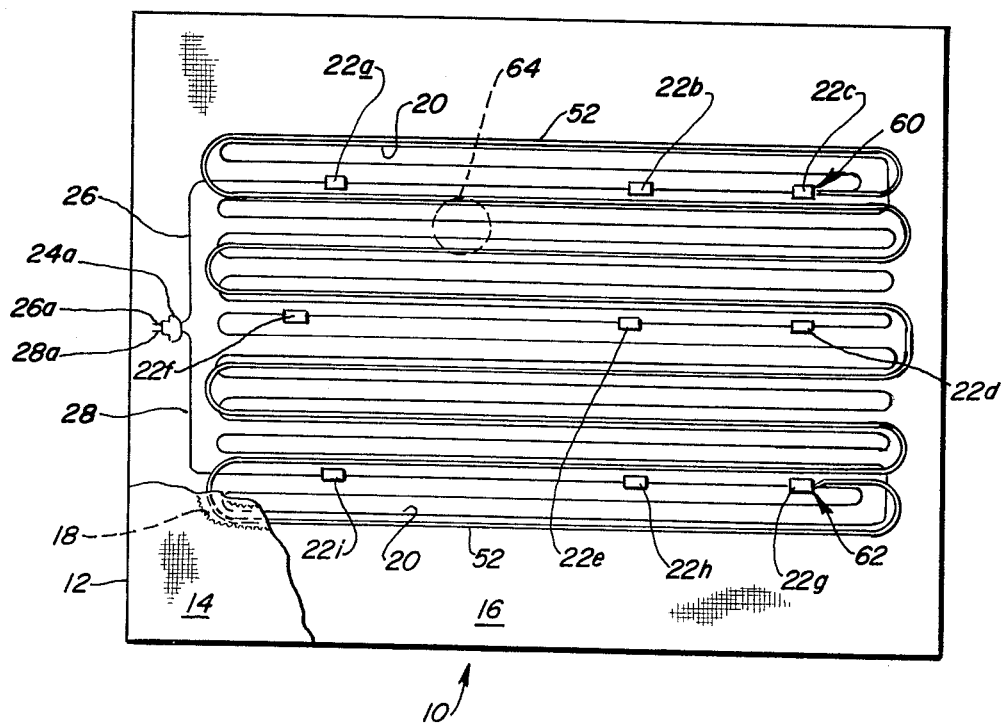
FIG. 2 is a positional layout of a heater, a sensor, and an array of safety thermostats in a fabric shell, for the embodiment of FIG. 1.

As shown in FIGS. 1 and 2, an electric bedcover 10, in which this invention is embodied, has several conventional features including a fabric shell 12, which has an upper ply 14 and a lower ply 16 and a network of serpentine passages 18 within the plies, and an elongated flexible heater 20, which is deployed through substantially all of the network of serpentine passages 18. Nine safety thermostats 22a-22i, among which the safety thermostat 22g having a bimetallic element that is operative to open and close a pair of electrical contacts as conventional safety thermostats have is modified pursuant to this invention as described below, are confined within the network of serpentine passages 18 and connected respectively between series segments 20a-20j of the heater 20 as shown in FIG. 1.

Conventionally, the heater 20 may be connected to a source of electrical power, which may be 120 VAC, 60 Hz, through a connector 24, which is indicated schematically in FIG. 1. A male component 24a of the connector 24 is shown in FIG. 2. The connector 24 receives electrical leads 26 and 28, which are connected respectively to opposite ends of the heater 20, and which thus are connected through associated pins 26a and 28a of the male component 24a to associated sockets of a female component (not shown) for further connection as described below. The connector 24 is similar to conventional connectors having two pins and two sockets.

The connector 24 connects the heater 20 to the source of electrical power through an ambient-responsive control 32 which is located outside the fabric shell 12, which comprises a resistor 34, a bimetallic arm 36, and a pair of electrical contacts 38, one of which is carried by the bimetallic arm 36, in series with each other and with the heater 20 through the lead 26, and which also comprises adjustable means 40 to bias the bimetallic arm 36 in conventional manner. The ambient-responsive control 32 cycles in conventional manner, over a period that is a function of ambient temperature, except when an overheated condition is sensed as discussed below.

In normal operation, when no overheated condition is sensed as discussed below, the resistor 34 heats the bimetallic arm 36, as long as the contacts 38 are closed. As ambient temperature increases, it takes less time to heat the bimetallic arm 36 sufficiently, so that the contacts 38 are opened. Conversely, as ambient temperature decreases, it takes more time to do so. Hence, the period over which the ambient-responsive control 32 cycles is an inverse function of ambient temperature, as is average heat dissipated by the heater 20.

An on-off switch 46, which may be a snap-action toggle switch, is connected between the ambient-responsive control 32 and one side of the source of electrical power. A conventional plug 48 is used to connect both sides of the heater 20, through the leads 26 and 28 and the connector 24 as mentioned above, to the source of electrical power.

As discussed above, the electric bedcover 10 resembles conventional electric bedcovers and operates as conventional electric bedcovers operate, except when an overheated condition is sensed as described below.

As mentioned in an earlier paragraph, an overheated condition in an electric bedcover may be caused by covering a substantial area of the electric bedcover as by a conventional blanket, by tucking more than unheated marginal portions of the electric bedcover under a mattress, by rumpling a substantial area of the electric bedcover, and otherwise.

In the electric bedcover 10, as in conventional electric bedcovers, if any one of the safety thermostats 22a-22i is heated sufficiently as when an overheated condition obtains, it opens so as to deenergize the heater 20, until it is cooled sufficiently to close so as to reenergize the heater 20. It then may cycle between its opened and closed conditions if the overheated condition persists.

Additionally, as improved by this invention, the electric bedcover 10 has a supplemental, standby, protective circuit, which is confined by the network of serpentine passages 18 within the fabric shell 12. Two principal components are required, namely, a resistor 50 which is added to the safety thermostat 22g and mounted for heat dissipation to a bimetallic element of the safety thermostat 22g, and an elongated flexible sensor 52 which is deployed through at least some of the passages 18 alongside the heater 20, as noted in FIG. 2.

It is preferable for the sensor 52 to be deployed, in every two or three passages 18, so that not more than two adjacent parallel passages 18 fail to contain an elongated run of the sensor 52, and so that all heated areas of the electric bedcover 10 are traversed by the sensor 50. Some parallel passages 18 thus contain not only an elongated run of the heater 20 but also an elongated run of the sensor 52.

The sensor 52 may be constructed as described in U.S. Pat. No. 2,581,212 to D. C. Spooner et al., U.S. Pat. No. 2,846,559 to J. Rosenberg, and U.S. Pat. No. 2,846,560 to J. F. Jacoby et al., so as to form a cable of small diameter and so as to comprise a pair of elongated flexible electrical conductors spaced from each other by a layer of material having a negative temperature coefficient of resistance. As shown schematically in FIG. 1, one such conductor 54 is spaced from the other conductor 56 by a layer 58 of such material, which may be chosen from a variety of suitable materials described in these patents.

Such material is chosen so that at normal temperatures, which obtain during normal operation of an electric bedcover, such material acts as an electrical insulator having a high impedance, whereas at elevated temperatures, which obtain during an overheated condition of an electric bedcover, such material acts as an electrical conductor having a low impedance. Suitable materials having suitable negative temperature coefficients of resistance are available commercially from The B. F. Goodrich Co., B. F. Goodrich Chemical Div., Independence, Ohio, as "GEON" No. 82726-natural-024, 0.8% doped with "Triton X-400" dopant.

As shown in FIG. 1, a circuit branch comprising the resistor 50, the conductor 54, the layer 58, and the conductor 56, in series with each other, is connected in parallel with a circuit branch comprising the segments 20d-20g of the heater 20, and the safety thermostats 22d-22f, in series with each other. The latter branch also comprises the safety thermostat 22g so as to allow the former branch to conduct while the safety thermostat 22g is opened as discussed below.

As shown in FIG. 1, the circuit branch comprising the resistor 50, the conductor 54, the layer 58, and the conductor 56, in series with each other, conducts little current except when some part of the layer 58 is heated so as to act as an electrical conductor having a low impedance as in an overheated condition of some part of the electric bedcover 10, rather than as an electrical insulator having a high impedance, because of the negative temperature coefficient of resistance of the material chosen for the layer 58 as discussed above. Therefore, said circuit branch dissipates little power through the resistor 50, or through other inherent resistances, except when some part of the layer 58 thus acts as a shunt between the conductor 54 and the conductor 56.

As shown in FIG. 1, the circuit branch comprising the resistor 50, the conductor 54, the layer 58, and the conductor 56, in series with each other, conducts sufficient current to cause the resistor 50 to dissipate sufficient heat to cause the bimetallic element of the safety thermostat 22g to open its contacts when some part of the layer 58 is heated so as to act as an electrical conductor having a low impedance as in an overheated condition of at least part of the electric bedcover 10, rather than as an electrical insulator having a high impedance, again because of the negative temperature coefficient of resistance of the material chosen for the layer 58 as discussed above. Such part of the layer 58 thus acts as a shunt between the conductor 54 and the conductor 56.

As shown, the conductor 56 is connected between the safety thermostat 22c and the segment 20d of the heater 20 in a package 60, which comprises the safety thermostat 22c, and the conductor 54 is connected to the resistor 50 in a package 62, which comprises the safety thermostat 22g and the resistor 50.

As shown in FIG. 1, the resistor 50 is not allowed to cool, once the bimetallic element of the safety thermostat 22g opens its contacts, so long as an overheated condition continues to be sensed by some part of the sensor 52 so as to heat some part of the layer 58. It is preferable not to connect the safety thermostat 22g outside the circuit branch comprising the segments 20d–20g of the heater 20, as would require the safety thermostat 22g to cycle off and if an overheated condition thus were sensed, and as would tend to allow undesirable build-up of heat.

As shown in FIG. 1, a protective circuit provided by this invention supplements the safety thermostats 22a–22d so as to sense an overheated condition that may obtain in a location away from any safety thermostat 22a–22i, as in the location 64 indicated in FIG. 2. As mentioned above, the protective circuit according to this invention dissipates little power during normal operation of the electric bedcover 10, and no separate relays or separate thermostatic devices are required.

If the ambient-responsive control 32 were to be bypassed, either deliberately or by a failure of the ambient-responsive control 32 whereby its contacts would not open, the heater 20 would be powered directly from line voltage. Nevertheless, the protective circuit according to this invention would not be bypassed.

As shown in FIG. 2, a protective circuit according to this invention is confined by the network of serpentine passages 18 within the fabric shell 12. It does not require any additional leads and permits standard connectors as exemplified by the connector 24 to be used to connect the ambient-responsive control 32 to the circuits confined by the fabric shell 12. It thus permits the electric bedcover 10 to be interchanged with other electric bedcovers designed for similar ambient-responsive controls.

As shown in FIGS. 1 and 2, a protective circuit according to this invention is dependent upon the ambient-responsive control 32, which cycles as discussed hereinabove. When the contacts 38 of the ambient-responsive control 32 are opened, there can be no differential in potential across any of the segments 20a–20j of the blanket heater 20, and thus there can be no differential in potential between the conductor 54 and the conductor 56. In some instances, it may be desirable for a protective circuit to be independent of any external control means, as in FIG. 1a.

Figure 1A:
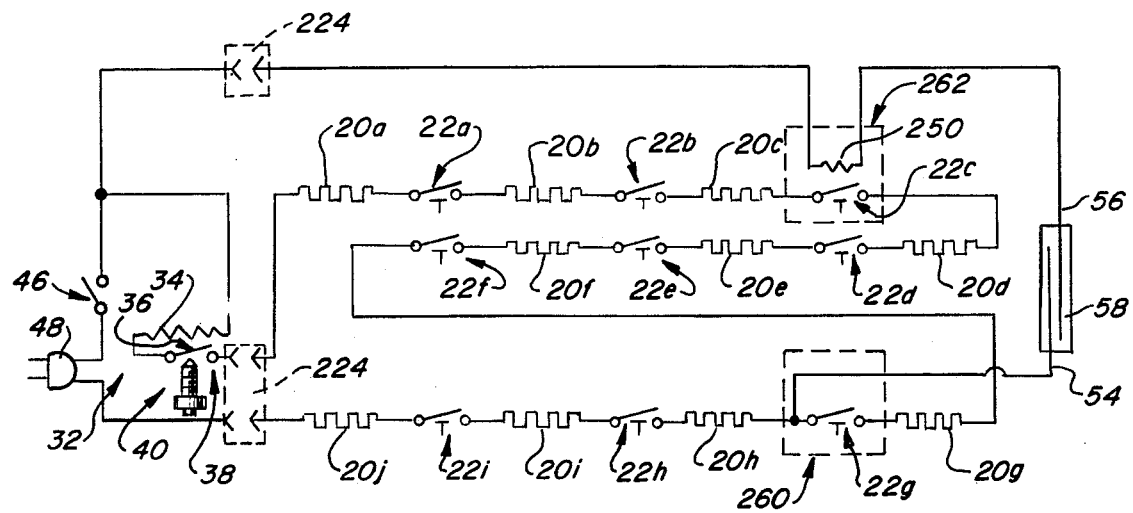
FIG. 1a, in which similar reference numerals refer to similar components, is a schematic diagram of an alternative arrangement of components in the embodiment of FIG. 1.

As shown in FIG. 1a, the conductor 54 is connected so as to be independent of the ambient-responsive control 32. A connector 224, which is indicated schematically in FIG. 1a, corresponds generally to the connector 24 of FIG. 1 but not only connects the leads 26 and 28 from opposite ends of the heater 20 to the ambient-responsive control 32, as in FIG. 1, but also connects a resistor 250 to the switch 46. The connector 224 is similar to conventional connectors having three pins and three sockets, as exemplified by a connector 124 in FIG. 4, as described below.

As shown in FIG. 1a, the resistor 250 is connected to the conductor 56, added to the safety thermostat 22c, and mounted for heat dissipation to a bimetallic element of the safety thermostat 22g. Thus, a circuit branch comprising the resistor 250, the conductor 56, the layer 58, and the conductor 54, in series with each other, is connected so as to maintain the conductor 54 and the conductor 56 at relatively different electrical potentials, even if the contacts 38 of the ambient-responsive control 32 are opened, and thus so as to be independent of the ambient-responsive control 32. In other respects, the protective circuit of FIG. 1 and the protective circuit of FIG. 1a function similarly.

As shown in FIG. 1 and 2 and described above, and also FIG. 1a, this invention is embodied in an electric bedcover having particular utility in a standard or narrower bed. As shown in full lines in FIGS. 3 and 4 and described below, this invention is embodied in an electric bedcover having particular utility in a double or wider bed and having one ambient-responsive control. It is known in an electric bedcover having such utility to provide a heater having parallel branches that can operate independently. As suggested in phantom lines in FIG. 3 and discussed below, this invention may be embodied in an electric bedcover having two ambient-responsive controls, one for each of two persons using a double or wider bed.

As shown in FIGS. 3 and 4, an electric bedcover 110, in which this invention is embodied, has similar conventional features including a fabric shell 112, which has an upper ply 114 and a lower ply 116 and a network of serpentine passages 118 between the plies, and an elongated flexible heater 120, which is deployed through substantially all of the network of serpentine passages 118. Nine safety thermostats 122a–122i, among which the safety thermostats 122c and 122g respectively having a bimetallic element that is operative to open and close a pair of electrical contacts are modified pursuant to this invention as described below, are confined within the network of serpentine passages 118 and connected respectively between series segments 120a–120k, as shown in FIG. 3.

The heater 120 has two parallel branches and a common return. A first branch of the heater 120 comprises the heater segment 120a, the safety thermostat 122a, the heater segment 120b, the safety thermostat 122b, the heater segment 120c, the safety thermostat 122c, which is modified as described below, and the heater segment 120d. A second branch of the heater 120 comprises the heater segment 120k, the safety thermostat 122i, the heater segment 120j the safety thermostat 122h, the heater segment 120i, the safety thermostat 122g, which is modified as described below, and the heater segment 120h. The common return of the heater 120 comprises the safety thermostat 122d, the heater segment 120e, the safety thermostat 122e, the heater segment 120f, the safety thermostat 122f, and the heater segment 120g.

It thus is possible for one parallel branch and the common return of the heater 120 to operate while the other branch of the heater 120 is inoperative as because a safety thermostat in the inoperative branch is opened. Both parallel branches and the common return of the heater are inoperative if a safety thermostat in the common return is opened.

Conventionally, the heater 120 may be connected to a source of electrical power, which may be 120 VAC, 60 Hz, through a connector 124, which is shown schematically in FIG. 3. A male component 124a of the connector 124 is shown in FIG. 2. The connector 124 receives electrical leads 126, 128, and 130, which are connected respectively to the first branch, the second branch, and the common return of the heater 120, and which thus are connected through associated pins 126a, 128a, and 130a of the male component 124a to associated sockets of a female component (not shown) for further connection as described below.

The connector 124 connects the heater 120 to the source of electrical power through an ambient-responsive control 132 which is located outside the fabric shell 112. The ambient-responsive control 132 comprises a resistor 134, a bimetallic arm 136, and a pair of electrical contacts 138, one of which is carried by the bimetallic arm 136, in series with each other and with the parallel branches of the heater 120 through the leads 126 and 128, which are connected to each other by a shunt 142 as indicated in FIG. 3. The ambient-responsive control 132 also comprises adjustable means 140 to bias the bimetallic arm 136 in conventional manner. The ambient-responsive control 132 cycles in conventional manner, over a period that is a function of ambient temperature, except when an overheated condition is sensed as discussed below.

In normal operation, when no overheated condition is sensed as discussed below, the resistor 134 heats the bimetallic arm 136, so long as the contacts 138 are closed. As ambient temperature increases, it takes less time to heat the bimetallic arm 136 sufficiently, so that the contacts 138 are opened. Conversely, as ambient temperature decreases, it takes more time to do so. Hence, the period over which the ambient-responsive control 132 cycles is an inverse function of ambient temperature, as is average heat dissipated by the heater 120.

An on-off switch 146, which may be a snap-action toggle switch, is connected between the ambient-responsive control 132 and one side of the source of electrical power. A conventional plug 148 is used to connect both sides of the heater 120, through the leads 126 and 128, on one side, and the lead 130, and the connector 124 as mentioned above, to the source of electrical power.

As indicated in phantom lines in FIG. 3, another ambient-responsive control 232, which is similar to the ambient-responsive control 132, may be used to connect the second branch of the heater 120 to the source of electrical power, whereupon the shunt 142 is omitted so that the ambient-responsive control 132 connects the first branch but not the second branch of the heater 120 to the source of electrical power. Thus, the period over which the ambient-responsive control 132 cycles as a function of ambient temperature and the period over which the ambient-responsive control 232 cycles as a function of ambient temperature are independently adjustable through the means 140 of the ambient-responsive control 132 and equivalent means (not shown) of the ambient-responsive control 232.

In the electric bedcover 110, as in conventional electric bedcovers having such branched heaters, if any one of the safety thermostats 122a, 122b, and 122c connected in the first branch of the heater 120 is heated sufficiently as when an overheated condition obtains in an area traversed by the first branch of the heater 120, it opens so as to deenergize the first branch of the heater 120, until it is cooled sufficiently to close so as to reenergize the first branch of the heater 120. Similarly, if any one of the safety thermostats 122g, 122h, and 122i connected in the second branch of the heater 120 is heated sufficiently as when an overheated condition obtains in an area traversed by the second branch of the heater 120, it opens so as to deenergize the second branch of the heater 120, until it is cooled sufficiently to close so as to reenergize the second branch of the heater 120.

Again as in conventional electric bedcovers having such branched heaters, if any one of the safety thermostats 122d, 122e, and 122f connected in the common return of the heater 120 is heated sufficiently as when an overheated condition obtains in an area traversed by the common return of the heater 120, it opens so as to deenergize the common return and thus both parallel branches of the heater 120, until it is cooled sufficiently to close so as to reenergize the heater 120. Whichever one of the safety thermostats 122a–122k is affected may cycle between its opened and closed conditions if the overheated condition persists.

Additionally, the electric bedcover 110 has a supplemental, standby, protective circuit, which is confined by the network of serpentine passages within the fabric shell 112, and which operates in like manner but independently for each parallel branch of the heater 120. Four principal components are required namely, a resistor 150 which is added to the safety thermostat 122c and mounted for heat dissipation to a bimetallic element of the safety thermostat 122c, an elongated flexible sensor 152 which is deployed through at least some of the passages 118 alongside the first branch of the heater 120, a resistor 250 which is added to the safety thermostat 122g and mounted for heat dissipation to a bimetallic element of the safety thermostat 122g, and an elongated flexible sensor 252 which is deployed through at least some of the passages 118 alongside the second branch of the heater 120, as noted in FIG. 4.

Again it is preferable for the sensors 152 and 252 to be deployed, in every two or three passages 118, so that not more than two adjacent parallel passages 118 fail to contain an elongated run either of the sensor 152 or of the sensor 252, and so that all heated areas of the electric bedcover 110 are traversed either by the sensor 152 or by the sensor 252. Some parallel passages 118 thus contain not only an elongated run of the first branch of the heater 120 but also an elongated run of the sensor 152. Other parallel passages 118 thus contain not only an elongated run of the second branch of the heater 120 but also an elongated run of the sensor 252.

The sensor 152 and the sensor 252 are similar to each other and to the sensor 52 described above, in specific regard to FIGS. 1 and 2, whereby each comprises a pair of elongated flexible electrical conductors spaced from each other by a layer of material having a negative temperature coefficient of resistance. As shown schematically, one such conductor 154 of the sensor 152 is spaced from the other conductor 156 of the sensor 152 by a layer of such material, and one such conductor 254 of the sensor 252 is spaced from the other conductor 256 of the sensor 252 by a layer of such material.

The sensor 152 and the sensor 252 are chosen, as the sensor 52 is chosen, so that at normal temperatures, which obtain during normal operation of an electric bedcover, such material acts as an electrical insulator having a high impedance, whereas at elevated temperatures, which obtain during an overheated condition of an electric bedcover, such material acts as an electrical insulator having low impedance.

As shown in FIG. 3, a circuit branch comprising the resistor 150, the conductor 154, the layer 158, and the conductor 156, in series with each other, is connected in parallel with a circuit branch comprising the segments 120d of the heater 120. The latter branch also comprises the safety thermostat 122c so as to allow the circuit branch comprising the resistor 150 and other series components to continue to conduct while the safety thermostat 122c is opened as discussed below.

Similarly, a circuit branch comprising the resistor 250, the conductor 254, the layer 258, and the conductor 256, in series with each other, is connected in parallel with a circuit branch comprising the segment 120h of the heater 120. The latter branch also comprises the safety thermostat 122g so as to allow the circuit branch comprising the resistor 250 and other series components to continue to conduct while the safety thermostat 122g is opened as discussed below.

As shown in FIG. 3, the conductor 156 and the conductor 154 through the resistor 150 thus are maintained at relatively different electrical potentials, so long as the first branch of the heater 120 operates. Similarly, the conductor 256 and the conductor 254 through the resistor 250 thus are maintained at relatively different electrical potentials, so long as the second branch of the heater 120 operates. However, once the first branch of the heater 120 is deenergized, there can be no potential drop between the conductor 154 and the conductor 156. Similarly, once the second branch of the heater 120 is deenergized, there can be no potential drop between the conductor 254 and the conductor 256.

As shown in FIG. 3, the conductor 154 and the conductor 254 are connected commonly to the safety thermostat 122d, and thus to the common return of the heater 120.

As shown in FIG. 3, the circuit branch comprising the resistor 150, the conductor 154, the layer 158, and the conductor 156, in series with each other, conducts little current except when some part of the layer 158 is heated so as to act as an electrical conductor having a low impedance as in an overheated condition of some part of the electric bedcover 110 as traversed by the sensor 152, rather than as an electrical insulator having a high impedance, because of the negative temperature coefficient of resistance of the material chosen for the layer 158 as discussed above. Therefore, said circuit branch dissipates little power through the resistor 150, or through other inherent resistances, except when some part of the layer 158 thus acts as a shunt between the conductor 154 and the conductor 156.

Similarly, the circuit branch comprising the resistor 250, the conductor 254, the layer 258, and the conductor 256, in series with each other, conducts little current except when some part of the layer 258 is heated so as to act as an electrical conductor having a low impedance as in an overheated condition of some part of the electric bedcover 110 as traversed by the sensor 252, because of the negative temperature coefficient of resistance of the material chosen for the layer 258 as discussed above. Therefore, said circuit branch dissipates little power through the resistor 250, or through other inherent resistances, except when some part of the layer 158 thus acts as a shunt between the conductor 154 and the conductor 156.

As shown in FIG. 3, the circuit branch comprising the resistor 150, the conductor 154, the layer 158, and the conductor 156, in series with each other, conducts sufficient current to cause the resistor 150 to dissipate sufficient heat to cause the bimetallic element of the safety thermostat 122c to open its contacts when some part of the layer 158 is heated so as to act as an electrical conductor having a low impedance as in an overheated condition of some part of the electric bedcover 110 as traversed by the sensor 152, rather than as an electrical insulator having a high impedance, again because of the negative temperature coefficient of resistance of the material chosen for the layer 158 as discussed above. Such part of the layer 158 thus acts as a shunt between the conductor 154 and the conductor 156.

Similarly, the circuit branch comprising the resistor 250, the conductor 254, the layer 258, and the conductor 256, in series with each other, conducts sufficient current to cause the resistor 250 to dissipate sufficient heat to cause the bimetallic element of the safety thermostat 122g to open its contacts when some part of the layer 258 is heated so as to act as an electrical conductor having a low impedance as in an overheated condition of some part of the electric bedcover 110 as traversed by the sensor 252, rather than as an electrical insulator having a high impedance, again because of the negative temperature coefficient of resistance of the material chosen for the layer 258 as discussed above. Such part of the layer 258 thus acts as a shunt between the conductor 254 and the conductor 256.

As shown in FIG. 3, the resistor 150 is not allowed to cool, once the bimetallic element of the safety thermostat 122c opens its contacts, so long as an overheated condition continues to be sensed by some part of the sensor 152 so as to heat some part of the layer 158. Similarly, the resistor 250 is not allowed to cool, once the bimetallic element of the safety thermostat 122g opens its contacts, so long as an overheated condition continues to be sensed by some part of the sensor 252 so as to heat some part of the layer 258.

As shown in FIG. 3, the protective circuits provided by this invention supplement the safety thermostats 122a–122i so as to sense an overheated condition that may obtain in a location away from any safety thermostat 122a–122i, as in the location 164 indicated in FIG. 2. As mentioned above, the protective circuits provided by this invention dissipate little power during normal operation of the electric bedcover 110, and no separate relays or separate thermostatic devices are required.

If the ambient-responsive control 132 were to be bypassed, either deliberately or by a failure of the ambient-responsive control 132 whereby its contact would not open, or if the ambient-responsive control 232 as may be used also were to be bypassed, the heater 120 would be powered directly from line voltage. Nevertheless, the protective circuits provided by this invention would not be bypassed.

As shown in FIG. 4, the protective circuits provided by this invention are confined by the network of serpentine passages 118 within the fabric shell 112. Said protective circuits do not require any additional leads and permit standard connectors, as exemplified by the connector 124, to be used to connect the ambient-responsive control 132, and the ambient-responsive control 232 if used, to the circuits confined by the fabric shell 112. Said protective circuits thus permit the electric bedcover 110 to be interchanged with other electric bedcovers designed for similar ambient-responsive controls.

A sensor may be made as described above in a length of about 80 feet, as for an electric bedcover for a standard bed, so as to exhibit net resistance of about 200,000 ohms between its conductors, if the sensor as a whole remains at a temperature of about 95° F., as in a normal operation of an electric bedcover, and so as to exhibit net resistance of about 10–20,000 ohms, if about a two-foot length of the sensor is heated to a temperature of about 250° F.

Thus, a protective circuit according to this invention may be designed to deenergize a blanket heater if about a two-foot length of the sensor is heated to about 150° F., as in an overheated condition of an electric bedcover. The resistor connected in series with the conductors and intermediate layer of the sensor thus may have a resistance of about 10–20,000 ohms over a comparable range of temperatures.

Significantly, a protective circuit according to this invention is contained entirely within the fabric shell of an electric blanket. Because a protective circuit according to this invention is independent of any external control means, such a circuit may be used advantageously not only in an electric bedcover having an ambient-responsive control but also in an electric bedcover having a solid-state control, a variable-resistance control, or other suitable control.

It is to be understood that the embodiments described above are exemplary and not intended to limit this invention as covered by the claims below. As this invention may be applied to other electric pads, blankets, and appliances, which are equivalent to an electric bedcover, all references herein to an electric bedcover are to be understood as to embrace such pads, blankets, and appliances.

I claim:

1. In an electric bedcover of a type comprising
    a fabric shell, which has plural plies and a network of serpentine passages within said plies,
    an elongated flexible heater, which is deployed throughout at least some of said passages, and
    a safety thermostat, which is connected in series with at least part of said heater and with plural conventional thermostats, which is located within said network of serpentine passages, which comprises a bimetallic element and electrical contacts arranged to be opened and closed by said bimetallic element, and which is operative to disconnect at least part of said heater from a source of electrical power at said contacts when said bimetallic element is heated sufficiently and to reconnect the same part of said heater to the source of electrical power through said contacts when said bimetallic element is cooled sufficiently, an improvement wherein an elongated flexible sensor, of a type comprising a pair of elongated flexible electrical conductors spaced from each other by an elongated flexible layer of material having a negative temperature coefficient of resistance, is deployed through at least some of said passages, wherein a resistor is mounted for heat dissipation from said resistor to the bimetallic element of said safety thermostat, and wherein a first circuit branch comprising said resistor, said conductors, and said layer, in series with each other, is confined by and embodied entirely within said network of serpentine passages so as not to require additional leads extending from the fabric shell and connected in parallel with a second circuit branch comprising at least part of said heater so as to maintain said conductors at relatively different electrical potentials at least when said heater operates, so as to conduct essentially no current except when said layer acts as an electrical conductor having low impedance rather than as an electrical insulator having high impedance, and so as to conduct sufficient current to cause said resistor to dissipate sufficient heat to cause said bimetallic element to open said contacts when some part of said layer is heated so as to act as an electrical conductor having low impedance rather than as an electrical insulator having high impedance, whereby said bimetallic element receives essentially no heat from said resistor except when said layer thus acts as an electrical conductor.

2. The improvement of claim 1, in an electric bedcover of said type in which said heater has two parallel branches deployed through at least some separate passages of said passages, in which said safety thermostat cooperates with one such branch of said heater as aforementioned, and in which another safety thermostat having a bimetallic element is provided to cooperate with the other branch of said heater, said improvement wherein a resistor is mounted for heat dissipation to the bimetallic element of the safety thermostat cooperating with said other branch of said heater, wherein said sensor has two branches deployed through at least some passages of said passages, and wherein each such branch of said sensor cooperates with the resistor mounted for heat dissipation to the bimetallic element of the safety thermostat cooperating with one such branch of said heater as aforementioned, whereby one such branch of said heater may operate while the other branch of said heater may be inoperative.

3. The improvement of claim 1, in an electric bedcover of said type in which said heater has two parallel branches deployed through at least some separate passages of said passages and a common return deployed in at least one of said passages, in which said safety thermostat cooperates with one such branch of said heater as aforementioned, and in which another safety thermostat having a bimetallic element is provided to cooperate with the other branch of said heater, said improvement wherein a resistor is mounted for heat dissipation to the bimetallic element of the safety thermostat cooperating with said other branch of said heater, wherein said sensor has two parallel branches deployed through at least some passages of said passages, and wherein each such branch of said sensor cooperates with the resistor mounted for heat dissipation to the bimetallic element of the safety thermostat cooperating with one such branch of said heater as aforementioned, whereby one such branch of said heater and the common return of said heater may operate while the other branch of said heater may be inoperative.

* * * * *